United States Patent Office.

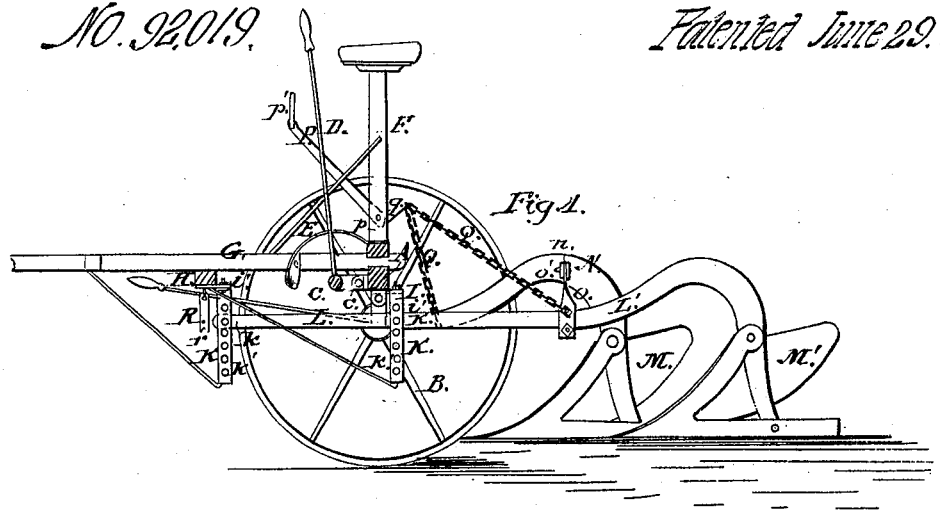
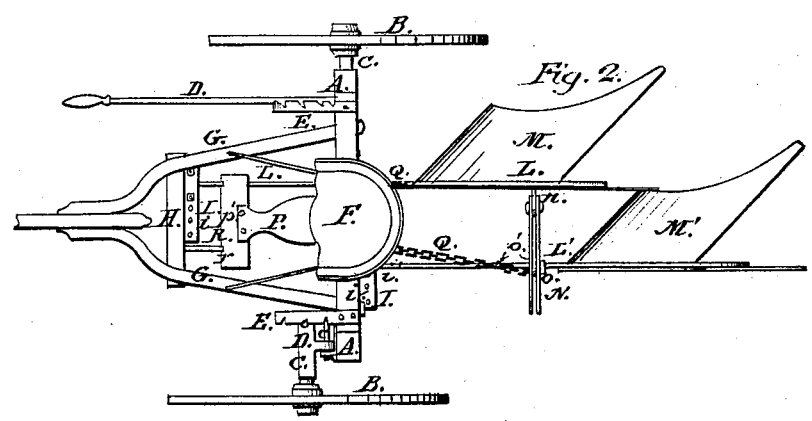
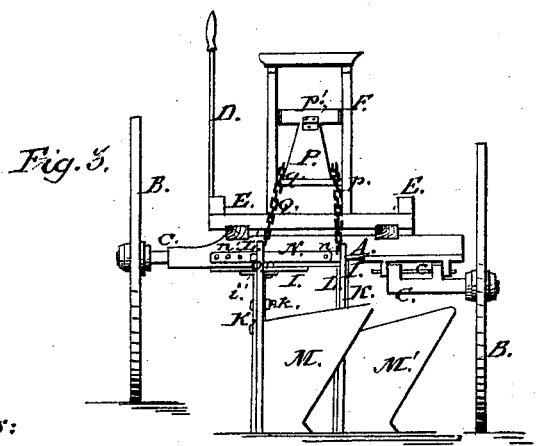

F. R. CROTHERS, OF SPARTA, ILLINOIS.

Letters Patent No. 92,019, dated June 29, 1869.

IMPROVEMENT IN GANG-PLOWS.

The Schedule referred to in these Letters Patent and making part of the same.

*To all whom it may concern:*

Be it known that I, F. R. CROTHERS, of Sparta, in the county of Randolph, and State of Illinois, have made certain new and useful Improvements in Gang-Plows; and I do hereby declare that the following is a full and true description thereof, reference being had to the accompanying drawings, and to the letters of reference marked thereon.

This invention relates to the method of attaching and connecting the plow-beams with the frame, and with each other, so that said beams, and the plows attached thereto, may have an independent vertical adjustment, in accordance with the nature of the soil, and so that the line of draught shall be as near the ground as practicable. This invention relates also to the arrangement of a foot-lever for throwing the plows out of ground, and to certain other details of construction.

To enable those herein skilled to make and use my said improved gang-plow, I will now more fully describe the same, referring to the accompanying Figure 1, as a sectional elevation; to
Figure 2, as a plan, and to
Figure 3, as a rear view.

In the usual form of my said gang-plow, I support the parts thereof upon an axle, A, made of the usual materials; said axle being connected with the wheels B.

In order that the frame, and axle A, may be adjusted to every condition of height of ground, (especially in ridgy soil,) and to permit one wheel to run in the furrow, while the other runs on unplowed land, I arrange, at each end of the main axle A, the sub-axles C, hinged at $c$ to said main axle, the wheels B being connected with the sub-axles in the usual manner.

A lever, D, is used to move each sub-axle, said lever engaging in the notched segment, E, when held at rest. The plowman may operate one of said levers, D, or both thereof, to regulate the height of the plow-frame, the adjustment thus to be achieved being perfect, to accommodate any condition of soil.

The levers D are made so as to spring into the notches of the segment E when released by the operator.

Upon the axle A, I arrange the seat-frame F; and projecting forward from said axle, I arrange the beams G, which meet to connect with or receive the tongue or pole of the plow.

Under said beams G, I secure the cross-bar H. To this the end of the forward plow-beam is connected, whilst the end of the rear beam is connected to the axle A.

To form said connection, I use the adjustment-plates I, secured to the parts H and A by bolts. Said plates are arranged with holes $i$, into which bolts $i'$ engage, by which the brackets K are attached.

Said brackets are formed of stout iron bars, so divided as to admit the ends of the plow-beams L and L' between them.

A joint-bolt, $k$, secures the plow-beams in the brackets. By tightening this bolt sufficiently, the plow-beam is held firmly against undue vibration. The bolts $k$ may be placed in any one of the holes $k'$, thus regulating the height of the plow-attachment from the ground, whereby the draught of the plows may be advantageously brought near to the line of the plow-resistance.

Similarly the plow-beams L and L' are capable of lateral adjustment by moving the brackets K upon the adjustment-plates I.

The plow-beams L L', I prefer to make of iron, curved in the form indicated in fig. 1, and connected with the plows M and M' at the rear end.

To connect the beams L L' with each other, and, nevertheless, permit the required independent adjustment thereof, (as stated to be in the nature of this invention,) I arrange the connecting-brace N, secured by a pivot, $n$, to the beam L, and connecting, by the link O, with the beam L.'

To allow for gauging the plows to the width of furrow, (this movement being also accommodated by the lateral movement of the brackets K, as aforesaid,) the brace N has a number of holes, $n'$, into either of which the joint-bolt $o'$, of the link O, is secured, as may be required.

In order to raise the plow out of the ground, I arrange the foot-lever P, pivoted at $p$ to the seat-frame F. This lever has at its forward end a suitable foot-plate, $p'$, and also has the lever-attachment $q$, and through this acts to raise the chains Q, attaching directly to the plow-beams L and L'.

When the lever P is to be retained in its lower position, a detent-bar, R, is used, which is pivoted to the cross-bar H, and holds the foot-plate in its notch $r$.

By means of the foot-lever P, the operator is thus enabled to raise or lower the plows, as may be desirable, without losing the use of his hands for driving the team, and whilst maintaining his proper position upon the seat of the plow.

Having thus fully described my invention,
What I claim, is—

1. The adjustment-plates I, and brackets K, arranged to permit a lateral and vertical adjustment of the plow-beams L L', substantially as set forth.

2. The beams L and L', and the brace N, and link O, when arranged adjustably, substantially as and for the purposes set forth.

3. The foot-lever P, its attachment $q$, and chains Q, acting to raise the beams L and L', and combined with the detent R, for holding the plows out of ground, substantially as set forth.

4. The axle A, and the adjustable sub-axle C, and frame G, when combined with the beams L and L', by attachment-devices, allowing each of said beams an independent vertical adjustment, substantially as set forth.

In witness of said invention, I have hereunto set my hand, in the presence of—

F. R. CROTHERS

Witnesses:
D. L. WISE,
J. H. CLENDENEN.